Figure 1:
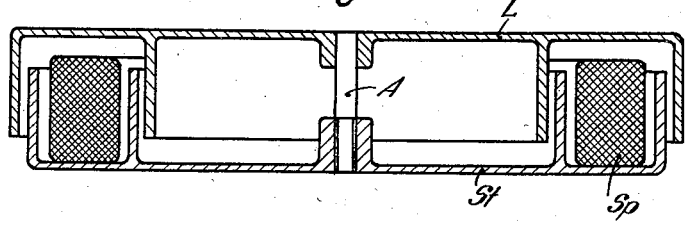

Oct. 15, 1935. O. JANZEN 2,017,624
SYNCHRONOUS MOTOR
Filed Jan. 13, 1931 2 Sheets-Sheet 1

O. Janzen
INVENTOR

Oct. 15, 1935.  O. JANZEN  2,017,624
SYNCHRONOUS MOTOR
Filed Jan. 13, 1931   2 Sheets-Sheet 2

Patented Oct. 15, 1935

2,017,624

UNITED STATES PATENT OFFICE 2,017,624

SYNCHRONOUS MOTOR

Otto Janzen, Berlin, Germany

Application January 13, 1931, Serial No. 508,538
In Germany January 17, 1930

1 Claim. (Cl. 172—275)

The invention relates to a synchronous motor which differs from the motors of the types already known by its simple construction, by the possibility of a simple and cheap manufacture and by its novel electromagnetic working. Particularly the way of its magnetization and the possibility of making it of cast iron lead to a very noiseless working of this motor so that the latter is extremely suitable for driving talking machines.

For the excitation of both the stator and the rotor one single coil is used which is concentric with the motor shaft. On account of the novel shape of the stator and the rotor this coil is fully enclosed by these items. As the pole teeth of the stator and the rotor are uniformly distributed over the whole periphery, also the magnetic field radiates radially in all directions so that the field resulting between stator and rotor is absolutely homogeneous in contrast to that of the general arrangement already well-known where one or several magnetic axes are made use of. The magnetic field being homogeneously distributed at the same time over all poles affords not only the advantage that all poles are simultaneously utilized for the work to be accomplished but also that the poles are all subject to the same radial magnetic attraction towards the center so that oscillations are not liable to arise in the magnetic axes of stator and rotor and thus the noise is reduced to a minimum.

A new departure also consists in the electromagnetic arrangement of the poles inasmuch as all poles on the periphery of the stator are of the same sign the same as all poles on the periphery of the rotor these signs being however opposite in either series of poles.

A new departure further consists in the fact that the geometric arrangement of the stator and the rotor is absolutely identical, this geometric similarity just resulting in the homogeneous magnetic field referred to as any cross section of the motor through the center line presents the same picture. A motor constructed in accordance with the present invention is thus given an excess of power which absolutely assures the perfect running of the record even if the range of amplitudes of the sound curve is rather extended.

A synchronous motor built on these general lines can be very simple and compact. In this case the stator is to be made in two halves in the contact plane of which is arranged the exciting coil which is concentric with the shaft center line of the plate and enclosed by the housing. In the said plane either half of the stator is provided with a flange square with the plate axis. Both flanges lead the magnetic flux around the coil and further contain the means for fastening both stator halves to each other.

Another advantage of the object of the invention consists in the fact that by it the synchronization is substantially facilitated as the rotor can more readily adjust itself to the synchronous speed on account of the yieldingness of the members.

The object of the invention is represented in several instances of execution in the accompanying drawings.

Figs. 1 to 9 show the construction of the stator and the rotor and diagrammatically the principle of working of the same, there being:—

Figure 2:
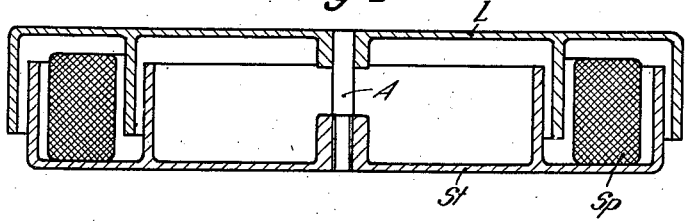
Figure 3:
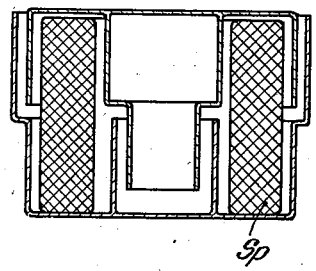
Figure 4:
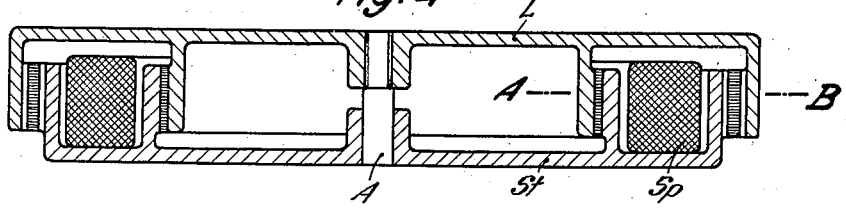
Figure 5:
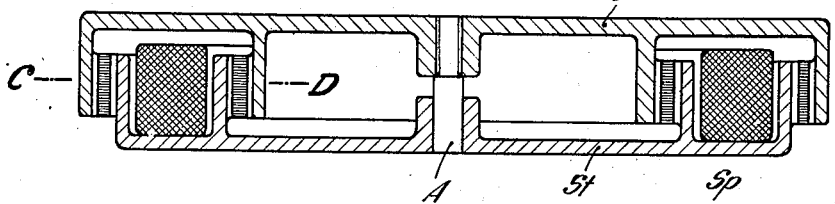
Figure 6:
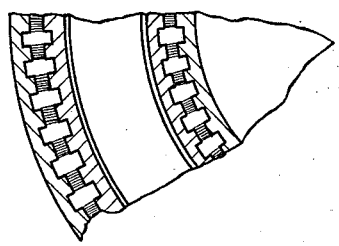
Figure 7:
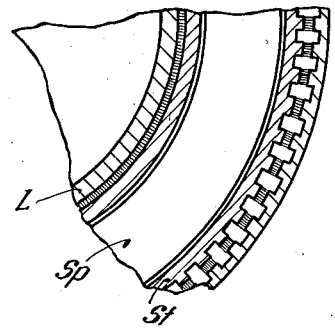
Figure 8:
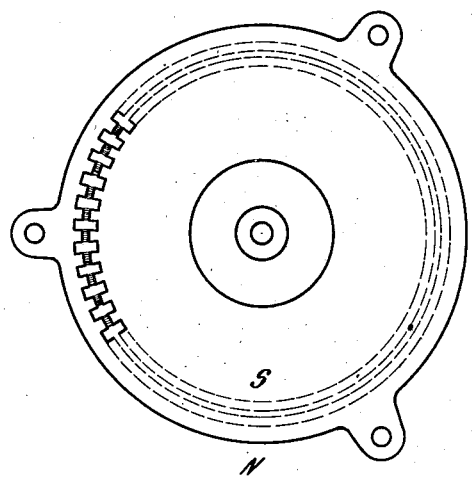
Figure 9:
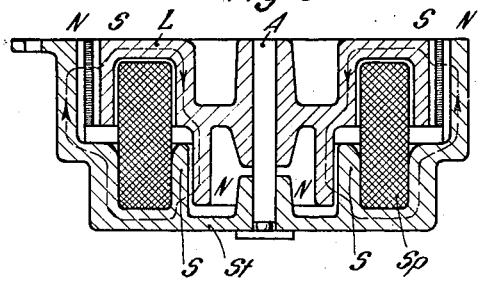

Figs. 1 to 5 sections through motors of various constructions,

Fig. 6 a cross section on line C—D of Fig. 5,

Fig. 7 a section on line A—B of Fig. 4,

Fig. 8 a top plan view of a motor,

Fig. 9 a section through the motor shown in Fig. 8,

The forms of execution corresponding to Figs. 1 and 2 are mainly suited for the obtention of a flat type such as required, that is, for talking-machine motors whereas Fig. 3 shows a type which is more compact in a lateral direction. The figures referred to clearly show that a single coil Sp is arranged concentrically in respect to the motor shaft A. The coil Sp is fully enclosed by the rotor L and the stator St. The magnetic circuit is closed over two air-gaps one of which is outside and the other within the coil. Fig. 4 is a more detailed representation of a motor corresponding to the diagram Fig. 1 the poles of which are arranged at the outside air-gap only as the section Fig. 7 clearly shows. The instance of execution represented by Fig. 5 essentially corresponds to the diagram Fig. 1 apart from the fact that the poles are arranged both at the inside and outside air-gaps. Thus, in this instance of execution double the number of poles will be effective as compared with Fig. 4 but, of course, the number of revolutions is determined only by the number of poles arranged on one and the same circle. Fig. 6 is a section of the instance of execution shown by Fig. 5. Figs. 8 and 9 show a motor arranged according to the diagram Fig. 3 but with outside and inside air-gaps located at different levels. Also in this case, similarly to the arrangements shown by Figs. 4 and 7, the poles are arranged at the outside air-gap only.

In all figures it has been clearly marked how the lines of force cross the air-gaps; moreover Fig. 9 shows the path of the same by means of dotted lines. In all cases the stator and the rotor are preferably made of cast iron.

When the rotor is moving, it is accelerated by the magnetic pull until the teeth of the stator and the rotor respectively are standing opposite each other. In this instant magnetic forces are developed which tend to keep the rotor in this symmetrical position. If the current and thus the magnetic field were of the same magnitude when pulling the rotor into the field and out of the field respectively, a torque supplying useful external work would not be developed. In fact this is not the case when there is a phase-displacement between the current and the position of the rotor which displacement is produced by itself as soon as the motor is under load, then the rotor is pulled in when the current is approximately at its maximum whereas the braking forces are determined by the weak currents developed in the neighbourhood of the zero value.

What I claim as my invention and desire to secure by Letters Patent, is—

In a slow speed synchronous motor of the character described for direct driving purposes, in combination a solid stator provided with teeth, a solid rotor having the same number of teeth and similar geometrical configuration relative to the magnetic field as the stator, an exciting coil adapted for the simultaneous excitation of stator and rotor, an alternating current source for exciting the said coil, the solid stator and solid rotor consisting of cast iron which forms a path of the lines of force having a high magnetic remanence for the magnetic flux.

OTTO JANZEN.